(12) United States Patent
Donaghue, Jr.

(10) Patent No.: US 6,256,381 B1
(45) Date of Patent: Jul. 3, 2001

(54) SYSTEM AND METHOD FOR IDENTIFYING A DATA RECORD ASSOCIATED WITH A TRANSFERRED TELEPHONE CALL

(75) Inventor: Norman J. Donaghue, Jr., Renton, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/183,753

(22) Filed: Oct. 30, 1998

(51) Int. Cl.$^7$ .................................................... H04M 3/00
(52) U.S. Cl. ......................... 379/265; 379/207; 379/233
(58) Field of Search ................................. 379/201, 207, 379/219, 220, 221, 265, 266, 309, 212, 233

(56) References Cited

U.S. PATENT DOCUMENTS

| 4,580,012 | 4/1986 | Matthews ............................ 179/18 B |
| 4,805,209 | * 2/1989 | Baker, Jr. et al. ................ 379/212 X |
| 5,452,349 | 9/1995 | Uehara ................................. 379/211 |
| 5,469,504 | * 11/1995 | Blaha ................................... 379/265 |
| 5,696,809 | * 12/1997 | Voit ................................... 379/266 X |
| 5,854,837 | * 12/1998 | Trader et al. ........................ 379/265 |
| 5,923,745 | * 7/1999 | Hurd ................................ 379/265 X |

FOREIGN PATENT DOCUMENTS

0610625 A3    8/1994 (EP) .

WO98/37676   8/1998 (WO) .

* cited by examiner

*Primary Examiner*—Creighton Smith
(74) *Attorney, Agent, or Firm*—David Volejnicek

(57) ABSTRACT

A system and method for identifying a data record associated with a transferred telephone call which is not dependent on the hardware of the particular telephone network and systems involved. In the preferred embodiment, to transfer a telephone call from a first call center to a second call center, the application server of the first call center sends a transfer request which includes the data record associated with the telephone call and the destination directory number (DDN) to which the call is to be transferred by the application server of the second call center. The application server of the second call center responds by sending a transfer response which includes a Direct Inward Dialing (DID) telephone number selected from a pool of available members to be used to establish the call transfer. The application server of the second call center also stores a transfer coordination record which contains the data record, the DID number and the DDN. Upon arrival of the transferred telephone call to the second call center, the application server of the second call center uses the DID number of the transferred call to access the stored DDN number to redirect the telephone call to the intended destination in the second call center and to access the data record and re-associate the data record with the transferred telephone call. Once the transferred call and associated data record have been re-associated the DID number is available for re-use.

28 Claims, 2 Drawing Sheets

US 6,256,381 B1

SYSTEM AND METHOD FOR IDENTIFYING A DATA RECORD ASSOCIATED WITH A TRANSFERRED TELEPHONE CALL

TECHNICAL FIELD

The present invention relates generally to the field of transferring telephone calls, in particular, to associating data records with a transferred telephone call.

BACKGROUND OF THE INVENTION

A call center is a facility for receiving and/or placing large volumes of telephone calls. The calls are received and placed by call servers, such as a combination of human agents with communication devices or automatic response units. Such call centers typically include an automatic call distributor or a private branch exchange for assigning each incoming call to a call server. A call server typically includes a telephone component and a workstation component to assist a human call agent. During the process of serving an original incoming telephone call, the call server may retrieve or originate an electronic data record related to the incoming call. The electronic data record is originated or retrieved and stored via a computer system which does not share the same communication path as the original incoming call.

In the course of servicing telephone calls, a first call server of a first call center may transfer an original incoming call to a second call server of a distant, separate second call center in which the call servers of the second call center may possess a specialty which may assist in serving the original incoming call. To increase service efficiency, the second call server should be able to quickly and automatically access the same data record originated or retrieved by the first call server for the original incoming call.

For automatic access, the second call server must automatically receive identification of the data record. The prior art which provides such identification uses either the identification of the calling party generally referred to as Caller ID to identify the specific call instance, or systems which send the data record identification in the telephone call itself using User to User Information (UUI), or systems which depend on some global identifier maintained by the telephone switching system. However, these prior art methods and systems can provide data record identification only on a limited basis because the methods and systems are not universally available and are not dependable.

The Caller ID approach is not universally available because many telephone systems do not have Caller ID, many systems use outbound only trunks which do not have a telephone number, many generating telephone systems do not provide for the inclusion of Caller ID, Caller ID is not uniformly passed between calling systems such as from long distance carriers to a local telephone network, many times Caller ID is only passed when the Signaling System #7 (SS7) method is used to deliver telephone calls within the Public Switched Telephone Network (PSTN), and many times Caller ID is only passed when special circuits like Integrated Services Digital Network (ISDN) are used. The Caller ID approach is also not dependable because many times the Caller ID is not unique to the caller and thus to a data record for the caller, but is rather a pilot number for an entire organization, a billing number, or is generated arbitrarily by the originating telephone system.

The UUI can only be communicated if ISDN circuits are used at both the source and destination. A great many networks are not ISDN and not all ISDN networks provide UUI. Also, UUI requires SS7 which is not universally available. Finally, in most cases the call center interfaces which are between the telephone network and the electronic based application used by the call server do not pass UUI in either direction.

Global identifiers are not maintained by many telephone systems and are not normally passed between telephone switches. If the switches do pass the global identifiers, they must be homogeneous having the same architecture or else they will not maintain the global identifiers. Also, in call center interfaces which do provide global identifiers, the software used only works with particular switches and networks.

Thus, the prior art systems and methods for providing data record identification to allow for automatic access of an associated electronic data record by a call server handling a call transferred from another call center are too often either not available or not sufficiently reliable. Based on the disadvantages of the prior art, a system and method are needed which would be nearly universally available and would reliably provide electronic data record identification to allow for automatic access of data records associated with transferred telephone calls.

SUMMARY OF THE INVENTION

The present invention resides in a data record and telephone call handling system for use with a telephone network and a data network. The system includes a first call connector configured to receive and route telephone calls originating with call origination devices. A first telephone call receiver associated with the first call connector receives telephone calls from the first call connector originated by the call origination devices. The system also includes data records which are associated with one of the originating telephone calls originated by one of the call origination devices.

In the illustrated embodiments, an assignment processor assigns a transfer routing telephone number to each of the data records to produce a first assignment. A second call connector associated with the assigned telephone number receives and routes telephone calls from the first call connector. A call processor is associated with the first call connector and uses the assigned telephone number to initiate a processor telephone call via the telephone network to the second call connector while the originating call origination device remains connected via the originating telephone call to the first call connector. The call processor also includes the originating call origination device in the processor telephone call.

The system further includes a second telephone call receiver associated with the second call connector which receives telephone calls from the second call connector including the processor telephone call. An access processor associated with the second call connector uses the assigned transfer routing telephone number and the first assignment to access the data record associated with the originating telephone call.

In further embodiments, the access processor accesses the data record associated with the originating telephone call using the data network having a communication path separate from a communication path of the processor telephone call. The first and second call connectors are private branch exchanges or automated call distributors. The assigned telephone number is a direct inward dialing (DID) number.

Another embodiment includes a selector configured to select DID numbers from a set of DID numbers. The set of DID numbers is those DID numbers that are available from a pool of reusable DID numbers, wherein an available DID number becomes unavailable upon being selected by the selector and linked to the data record associated with the originating telephone call and remains unavailable until the processor accesses the data record associated with the originating telephone call.

Other features and advantages of the invention will become apparent from the following detailed description, taken in conjunction with the accompanying drawings.

DETAILED DESCRIPTION OF THE INVENTION

Figure 1:
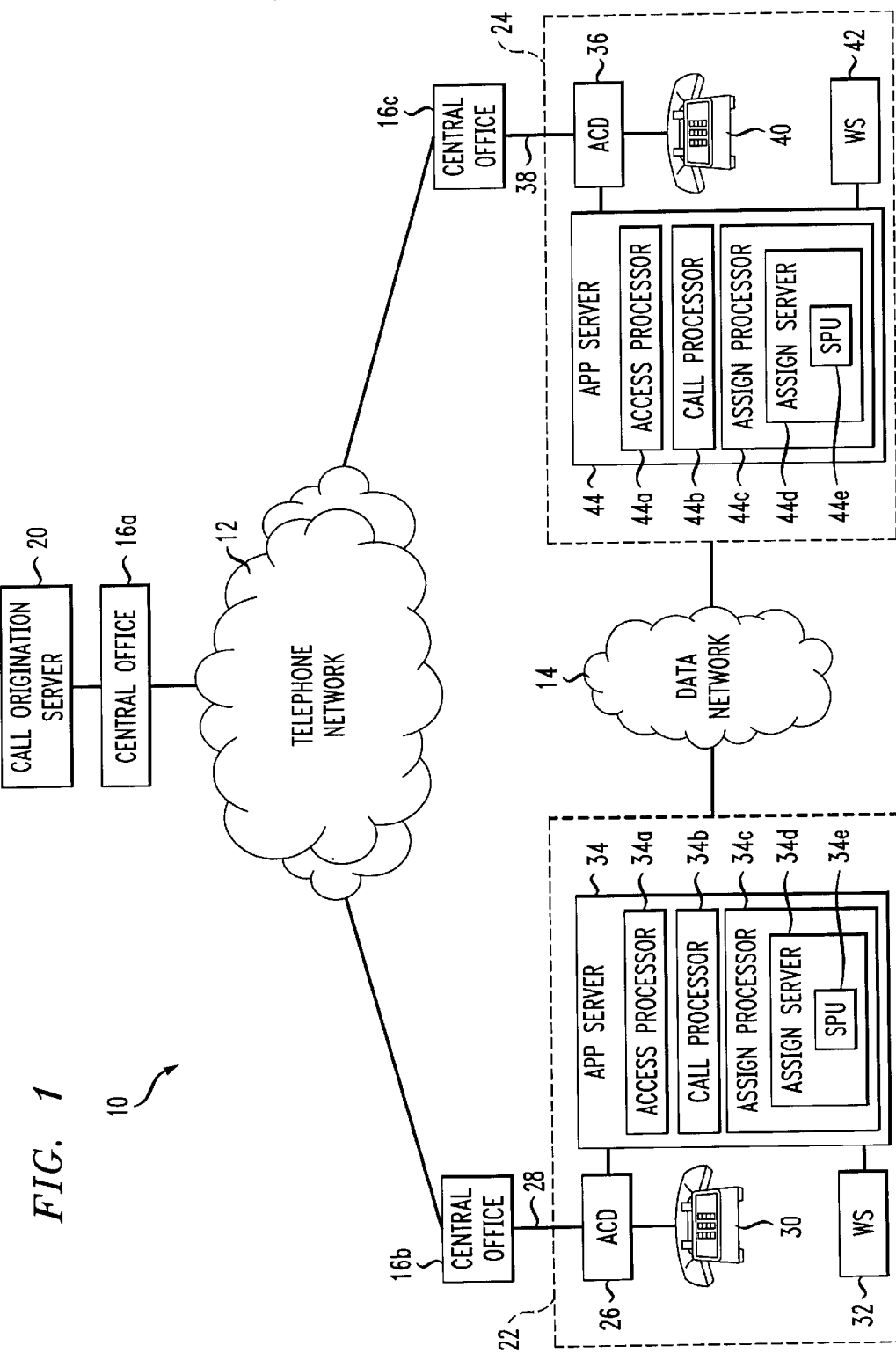
FIG. 1 is a functional block diagram showing the telephone network, call origination device, call centers, and call servers of the present invention.

The present invention provides a data record and telephone call handling system and method for identifying a data record associated with a transferred telephone call which is nearly universal in that it is not dependent on particular switches, telephone circuits, interfaces or methods of delivering calls associated with call centers and telephone networks. The present invention reliably provides identification of electronic data records to allow for automatic access of data records associated with transferred telephone calls.

In a preferred embodiment, the system and method utilizes in a unique way the Direct Inward Dialing (DID) service provided by telephone companies. A DID service assigns DID numbers, which are telephone numbers, to a customer with the understanding that telephone calls established using the DID numbers will be delivered to a particular telephone interface, along with the DID number used to establish the call. Calls established using several different DID numbers may be delivered to the same telephone interface, each accompanied with and identified by the DID number used to establish the call. This embodiment utilizes features of the DID service which are intended and in the past were only used for other purposes and with other types of systems not related to the objectives of the present invention. A DID number is obtained from the DID service by the present invention and incorporated into its systems and methods as a transfer routing telephone number to identify a particular transfer transaction, thus causing a telephone call to be delivered to a particular telephone interface along with the associated data record identification. Thus, by utilizing the systems and methods of the preferred embodiment of the present invention, a call transfer process can use a DID number to both transfer a telephone call and to identify and access the electronic data record which was associated with the original telephone call for use with the now transferred call. Once the transfer process is complete (the call and data record have been transferred) the DID number is available for reuse in subsequent transfer processes.

Under a DID service offering, a telephone company leases to a customer the right to use a designated DID number or group of DID numbers with the understanding that the telephone company will deliver telephone calls that are established using one of the leased DID numbers to a particular telephone interface. Thus, one or more DID numbers could be used to deliver telephone calls to a particular telephone interface. The telephone company leases DID numbers for a period of time which is usually one to three months.

For example, a sales company which sells three different consumer items may run a nationwide advertising campaign. The sales company may lease for several months one DID number for each one of the three consumer items. Prospective customers could then use a particular one of the three DID numbers to call to order or request additional information regarding a particular one of the three items. To connect a DID call placed by a customer, the telephone company uses a computerized database which uses the called DID number to look up the particular telephone interface of the sales company. The call is then connected to the telephone interface of the sales company, along with the DID number. The sales companies telephone system then connects the call to a sales agent. Given the nature of DID numbers, the telephone company could connect a customer to the same telephone interface of the sales company, regardless of which of the three DID numbers was called. The telephone company could, along with the call, furnish to the sales company's telephone system identification of which of the three DID numbers was used by the customer to place the call. The sales agent knowing the DID dialed by the customer could then respond accordingly without having to ask the customer which item was of interest.

The DID service operates independently of the particular telephone system circuits that are used to deliver the DID directed telephone call. For instance, a DID service can be used with analog circuits including analog trunk circuits (DID trunks, E & M trunks, etc.) and digital circuits including ISDN circuits, circuits using SS7 and digital circuits having the "T1" designation. The DID service thus provides universal operability which is lacking in the prior art methods and systems.

The DID service also delivers the called party address (the DID number) along with the telephone call to the designated telephone interface. Since the DID number is the logical address of the called party, delivering the DID number along with the telephone call is an important feature because more than one DID number can be used to designate a particular physical telephone interface. By receiving the DID number used to establish the telephone call along with the telephone call, the recipient can use the delivered DID number to better respond to the particular telephone call.

The DID service was established to support on-going activities which typically last at least one month. The periods for lease of the DID service are of similar duration. DID numbers are typically used to identify a message for a pager or voice mail of a particular person or a telephone call for a particular person. In advertising DID numbers are extensively used to identify a telephone call for a particular product or service. Although the items are different in each application, the constant factor is that the DID number is used for a certain length of time. DID numbers are assigned to the various items before the original telephone calls are received and DID numbers are used for a designated duration of time to identify a particular item or person related to multiple original telephone calls received.

Contrary to prior art systems and methods, the preferred embodiment of the present invention uses DID numbers to identify a particular item (i.e., a data record) only for one original telephone call which includes a transfer of the original telephone call. Therefore, in the preferred embodiment, assignment of DID numbers is transaction dependent rather than time dependent. Another unique feature of the preferred embodiment of the present invention is that the DID numbers are assigned to identify a particular item in real time as the related original telephone call is being processed.

As depicted in FIG. 1 for purposes of illustration, the system and method of the preferred embodiment of the present invention utilizes an overall system 10 which comprises a telephone network 12 and a data network 14. The data network 14 is not limited to any particular form of communication system to transmit data and may include data paths which utilize a portion of a telephone network, however, the data portions would not share the same communication path as the telephone network 12 uses to transmit the original telephone call or the transferred telephone call. In general, access is provided to the telephone network through three distant and separate central office switches 16a, 16b and 16c. A call origination device 20 (such as a telephone) is used to establish the original telephone call through the telephone network 12 and to one of several possible call centers 22 and 24. To simplify the illustration, only one call origination device 20 and two call centers, referred to for convenience as a first call center 22 and a second call center 24 are shown. In a typical application, the call origination device could be any device which could place telephone calls. Also, several, tens, or hundreds of call centers may be involved.

The first call center 22 includes a call connector, such as an automatic call distributor (ACD) 26 which distributes calls to multiple call servers which may be human call agents and/or automatic response units. Each call server includes a telephone and a workstation. For simplicity of illustration, only one call server, which includes a telephone 30 and a workstation 32, is shown being served by the ACD 26. Each ACD is tied into the workstations which it serves by an application server 34. Typically, the ACD 26 is linked to the application server 34 and the application server is linked both to the data network 14 and the workstation 32. The application servers 34 are also tied into the data network 14 in order to communicate with one another. Similarly, the second call center 24 includes a call connector, such as an ACD, 36 which serves a telephone 40 and a workstation 42 comprising a call server. An application server 44 is linked to the data network 14 and the workstation 42. Both application servers 34 and 44 have processors including access processors 34a and 44a, call processors 34b and 44b, and assignment processors 34c and 44c respectively, as shown in FIG. 1. In one embodiment, these processors are functionally integrated in the application software of the application servers 34 and 44. In other embodiments, these processors are separate hardware processors integrated into the application servers 34 and 44. The processors of the invention are not limited to particular configurations of hardware and software but rather include systems and methods of electronic data processing known in the art.

In other embodiments, the automatic call distributors 26 and 36 could be replaced with other types of call connectors such as private branch exchanges (PBX), a Central Office switch, or other types of telephone switches. It is also possible for the invention to be practiced using single call servers which are tied directly into a central office switch and the data network such as when only one call server exists in a particular location.

Figure 2:
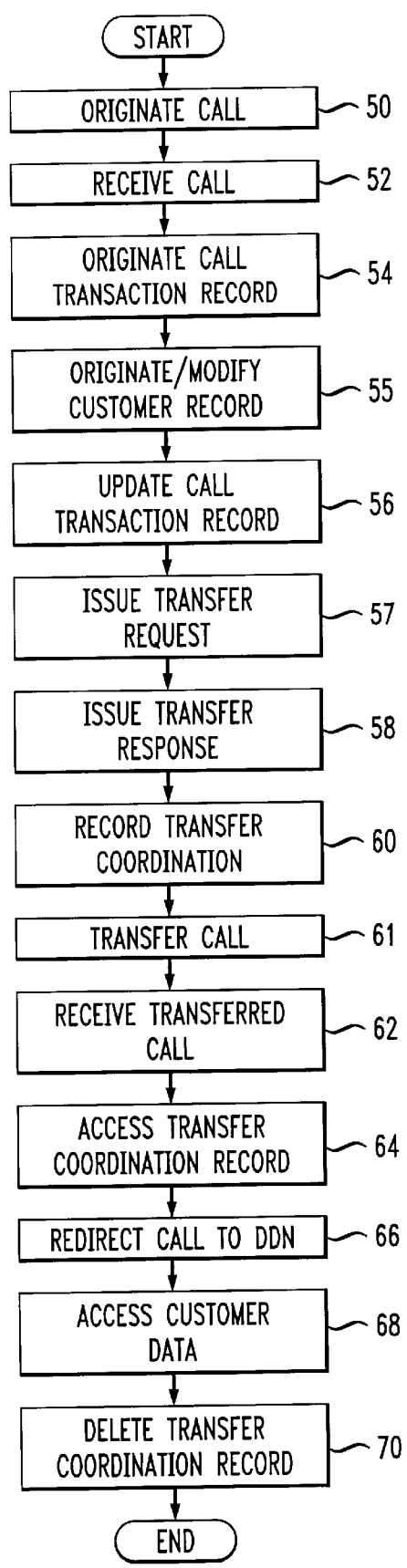
FIG. 2 is a flowchart showing the method of the present invention of transferring a telephone call and passing on identification of a data record associated with the transferred telephone call.

For purposes of illustration, the case is described herein where the call origination device 20 sends a telephone call to the first call center 22 which establishes a data record. The telephone call, along with the data record, is subsequently transferred to second call center 24. FIG. 2 illustrates this process including the process of establishing access by the second call center 24 to the data record. The process first starts at step 50 where the call origination device 20 establishes a telephone call to the first call center 22 via the central office 16a, the telephone network 12 and the central office 16b in a conventional maimer. The first call center 22 receives the telephone call at step 52 where the ACD 26 distributes the telephone call to the telephone 30 acting as a telephone call receiver. Upon receipt of the incoming call by the ACD 26, the application server 34 operates as a data generator by generating electronic data unique to the telephone call in the form of an electronic call transaction data record (CTR) in step 54. In step 55, the workstation 32 of the first call center 22 creates a customer data record for the call. The customer data record typically resides on the application server 34 of the first call center 22, but could reside on other computers of the data network 14. Typically the customer data record would contain information regarding a customer, and thus would be called a customer data record. The customer data record, however, is not limited to containing information about customers, but could contain other types of information related to the telephone call. As the telephone call is being serviced at the first call center 22, the customer data record is modified. The CTR is updated accordingly in step 56 to record aspects of the call, such as originating or accessing customer data records. The CTR can be used to access the customer data record as discussed below. Alternatively in step 55, the application server 34 may retrieve an already existing customer data record for subsequent review or modification by the workstation 32.

After servicing the incoming call, the call server handling the original telephone call may desire to or be required to transfer the original telephone call to the telephone 40 of another call server of the second call center 24. Before the telephone 30 of the first call center 22 initiates a transfer of the telephone call through the telephone network 12, the application server 34 with its assignment processor 34c having a first assignment server 34d with a selector processing unit 34e, uses a data transmitter to send a transfer request in step 57 through the data network 14 to the data receiver of the application server 44 of the second call center 24. The transfer request includes the call transaction data record (CTR) originated in step 54. The transfer request may also include the destination directory number (DDN) of the telephone 40 to which the telephone call is to be transferred if it is desired that a particular agent of the second call center 24 receive the transferred telephone call.

The application server 44 of the second call center 24 uses its data receiver to receive the transfer request and the included CTR. As part of a "closed loop" or feedback reservation scheme, the application server 44 of the second call center 24 with its assignment processor 44c, having a second assignment server 44d with a selector processing unit 44e, replies in step 58 by selecting a Direct Inward Dial (DID) number from a pool of available DID numbers and assigns the selected DID number to the CTR. Although in the depicted embodiment each assignment processor has an assignment server with a selector processing unit, the present invention is not limited to this particular arrangement. In other embodiments, selectors are incorporated into the call centers and application servers using other configurations of hardware or software known in the fields of information systems, data processing, and communications. If a DID number is temporarily being used, an electronic identification in the application server 44 of the second call center 24 indicates its unavailability. In step 58, the application server 44 of the second call center 24 then uses its data transmitter to send a transfer response which includes the selected DID number back to the data receiver of the application server 34 of the transferring first call center 22. In step 60, the application server 44 records the selected DID number along with the DDN from the transfer request as a transfer coordination record (TCR) in a transfer coordination record database internal to the application server 44. The CTR is stored by the application server 44 along with an index that the application server 44 subsequently uses to retrieve the CTR. The index is generated by an index generator which is part of the application server 44. The TCR also includes the index generated by the index generator of the application server 44 which is used subsequently by the application server 44 to access the CTR sent in the transfer request. Thus, the application server 44 uses its assignment processor 44c which effectively assigns a DID number to the CTR which is used by the access processor 44a of the application server 44 to access the customer data record.

In step 61, the application server 34 of the first call center 22 or the telephone 30 of the first call center 22 or other device of the telephone network 12 initiates transfer of the telephone call to the second call center 24 through the telephone network 12. Subsequently, the application server 34 of the first call center 22, operating as a call processor, uses the selected DID number as the destination telephone number for the second call center 24 in establishing the transfer of the telephone call. In transferring the telephone call, the application server 34 of the first call center 22 acts as a call processor in which the call origination device 20 is maintained as a party to the transferred call. The transfer process results in either a transferred call, if the telephone 30 of the first call center 22 does not remain a party to the call after the transfer is complete, or a conference call if the telephone 30 of the first call center 22 remains a party after the transfer is complete. In step 62, the ACD 36 of the second call center 24 receives the transferred telephone call. In step 64, the application server 44 of the second call center 24 uses the incoming DID number to access the transfer coordination record from the internal transfer coordination record database. From the stored transfer coordination record the destination directory number (DDN) for the transferred telephone call is accessed by the application server 44 which directs the ACD 36 to route the telephone call in step 66 to the telephone 40.

The stored transfer coordination record for the selected DID number also holds the index to access the CTR associated with the customer data record of the transferred telephone call. Concurrent to routing the transferred call to the telephone 40, the application server 44, operating as an access processor, accesses the CTR via the index stored in the TCR and then uses the CTR to allow access via direct internal connection or via the data network 14 of the customer data record associated with the telephone call to the workstation 42 of the second call center 24 in step 68. After the telephone call is routed and the workstation accesses the customer data record, the transfer coordination record is deleted in step 70. Once the transfer coordination record is deleted, the selected DID number used in the present transfer can be placed back into the pool of available DID numbers and is free to be selected again for another transfer. A first in, first out (FIFO) order would typically be utilized for the selection of the DID numbers, but other orders, such as last in, first out (LIFO) or a sequential ordering can be used.

The method used to assign DID numbers in step 58 discussed above will depend on the configuration of the associated call centers and telephone network. Typically, a call center which can accept a transfer will need a group of trunk circuits and at least one pool of DID numbers. The number of trunks required in the trunk group will depend upon the particular traffic conditions at the call center. At least one trunk will be required for each transfer or conference that will be simultaneously in existence.

If there are only two call centers in the network, where only one call center receives transfers, the requirements of the DID pool is minimal. Only one pool is required at the call center that receives the transfers because the one pool can be dedicated to the call center not receiving transfers. No other pool is needed in this case. The number of DID numbers required in a pool is dependent on the number of transfers or conferences that are expected to be in the set-up phase simultaneously. The set-up phase is the time when a transfer is initiated by a service call center until the data record and telephone call at the receiving end have been associated by a destination call center and the DID number released for reuse. This can be determined by normal traffic engineering methods which take into account an acceptable grade of service, the rate at which transfers occur, and the average time required for the setup phase of transfer.

Another case is where there is a plurality of call centers that only transfer calls and only one call center that receives transfers. A separate pool of available DID numbers can be used at the call center that receives transfers for each of the plurality of call centers that only transfer calls. This method is less than ideal because it results in many small pools, each serving one call center. This requires more DID numbers than would be required by one large pool serving all call centers. Using separate pools does have the advantage that assignment of DID numbers for one transferring call center is accomplished independent of the other transferring call centers. This independent nature helps to isolate delay problems and allows for either an "open loop" (nonfeedback) reservation scheme or a "closed loop" (feedback) reservation scheme. The "closed loop" reservation scheme is used in the preferred embodiment described above in terms of the application server 44 of the second call center 24.

In the "open loop" reservation scheme, there is no feedback or coordination between the receiving call center and transferring call centers. The selection of the DID number is controlled entirely by each transferring call center since the receiving call center has a separate pool of DID numbers for each transferring call center. Each of the dedicated pools of DID numbers at the receiving call center is known to the particular transferring call center to which the pool is dedicated. The particular transferring call center selects from those DID numbers of the dedicated pool that are not currently in use as indicated electronically in the application server of the transferring call center.

Given the case of one receiving call center and a plurality of transfer only call centers, an alternative method of assigning DID numbers is to use one large common pool of DID numbers for the receiving call center. This method is used in the preferred embodiment of the invention. The size of this pool is determined by the traffic between the receiving call center and the transferring call centers and the acceptable grade of service for this traffic. The traffic depends on the number of transfers per hour and the average duration of the set-up phase for each transfer. The acceptable grade of service depends on the portion of transfers which are delayed due to unavailability of a DID number. This can be determined by a standard EralngC formula of traffic engineering for lost calls held in operation. Use of a common DID pool for all transferring call centers requires coordination between the transferring call centers and the receiving call center in the assignment of the specific DID numbers to particular calls. The call centers may be at geographically distant locations. A "closed loop" or feedback reservation scheme for the selection of DID numbers controlled by the receiving location is needed in order to provide such coordination.

In the "closed loop" reservation scheme, the selection of the DID number is coordinated between the transferring and receiving call centers for a particular telephone call transfer. Given the benefits of a common DID pool described above, the closed loop method with a common pool of DID numbers for each receiving call center is used in the presently preferred embodiment. Typically, the application server of the transferring call center requests a DID number to use for the transfer from the application server of the receiving call center. In turn, the application server of the receiving call center checks that both a transfer trunk and a DID number are available before accepting the transfer request. The application server of the receiving call center selects a DID number from its common pool and informs the transferring call center of the DID number selected. The application server of the receiving call center electronically identifies the DID number as in use. The subsequent events of transferring the call and accessing data are described above. The selection of DID numbers from a pool for assignment to a customer data record using the "closed" or "open" loop schemes was described in terms of only one receiving call center with a plurality of transfer only call centers. However, the selection and assignment of DID numbers follow the same methods described for the case of multiple receiving and transferring call centers including call centers that both transfer and receive transferred telephone calls.

While the present invention has been shown and described with reference to preferred embodiments, it will be understood by those skilled in the art that various changes or modifications in form and detail may be made without departing from the scope of the invention. The invention can be utilized in network environments which have dissimilar or non-homogeneous call connectors that are designed for different telephone circuitry, formats, messaging methods, protocols, or interfaces or other such parameters related to a telephone system since the systems and methods of the present invention utilize a DID number service which is not dependent on particular telephone networks or call connectors. Also, a series of more than one transfers can occur from one original telephone call from a call origination device. For a series of more than one transfer, the described process of transfer is repeated as many times as necessary to accomplish all transfers in the particular series.

The preferred embodiment was described in terms of utilizing a Direct Inward Dialing (DID) service, however, other similar services such as Dialed Number Identification Service (DNIS) could also be utilized by other embodiments of the invention. The preferred embodiment described a call server as including a separate telephone 30 and a separate workstation 32, however, the telephone and workstation could be integrated together and the application server 34 may also be integrated into either the call server or the call connector as long as the communication paths used for the original telephone call and its subsequent transfer are different from the communication paths used for sending the transfer request and transfer response described above.

The preferred embodiment was described as using an application server at the transferring call center to originate the call transaction record, and subsequently send the call transaction record to a separate application server at the receiving call center. However, in other embodiments the call transaction record may be originated, accessed, and stored on a single server to which both the transferring and receiving call centers have direct access. In a further embodiment, the call transaction record and the customer data record may be incorporated into a single data record. In this embodiment, the single record would be sent by the application server of the transferring call center to the application server of the receiving call center as was described above for the case where the call transaction was sent and received by the call centers. By incorporating the customer data record into the call transaction record, it is not necessary to first access a call transaction record and then access a customer data record.

It is claimed:

1. A data record and telephone call handling system for use with a telephone network and a data network, said data record and telephone call handling system comprising:

a first call connector configured to receive and route telephone calls originating with call origination devices;

a first telephone call receiver associated with said first call connector, said first telephone call receiver configured to receive telephone calls from said first call connector originated by said call origination devices;

data records, each associated with one of said originating telephone calls originated by one of said call origination devices;

an assignment processor configured to assign a transfer routing telephone number to each of said data records to produce a first assignment;

a second call connector configured to receive and route telephone calls from said first call connector, said second call connector being associated with said assigned transfer routing telephone number;

a call processor associated with said first call connector, said call processor configured to use said assigned transfer routing telephone number to initiate a call processor controlled telephone call via the telephone network to said second call connector while said originating call origination device remains connected via said originating telephone call to said first call connector, said call processor configured to include said originating call origination device in said call processor controlled telephone call;

a second telephone call receiver associated with said second call connector, said second telephone call receiver configured to receive telephone calls from said second call connector including said call processor controlled telephone call; and an access processor associated with said second call connector, said access processor configured to use said assigned transfer routing telephone number and said first assignment to access said data record associated with said originating telephone call.

2. The data record and telephone handling system of claim 1, further including:

a second assignment processor configured to assign a second transfer routing telephone number to said accessed data record to produce a second assignment;

a third call connector configured to receive and route telephone calls from said second call connector, said third call connector being associated with said assigned second transfer routing telephone number;

a second call processor associated with said second call connector, said second call processor configured to use said assigned second transfer routing telephone number to initiate a second call processor controlled telephone call via the telephone network to said third call connector while said originating call origination device remains connected via said originating telephone call to said second call connector, said call processor configured to include said originating call origination device in said call processor controlled telephone call; and a second access processor associated with said third call connector, said access processor configured to use said assigned second transfer routing telephone number and said second assignment to access said data record associated with said originating telephone call.

3. The system of claim 1 wherein said access processor associated with said second call connector accesses said data record associated with said originating telephone call using the data network having a communication path separate from a communication path of said processor telephone call.

4. The system of claim 1 wherein said call processor associated with said first call connector establishes said call processor controlled telephone call in which said first telephone call receiver and said originating call origination device are placed in communication with said second telephone call receiver.

5. The system of claim 1 wherein said first and second call connectors are private branch exchanges (PBX).

6. The system of claim 1 wherein said first and second call connectors are automated call distributors (ACD).

7. The system of claim 1 wherein said assigned transfer routing telephone number is a DID number.

8. The system of claim 1, further including:
a first assignment server associated with said first call connector, said first assignment server having a data transmitter to transmit said data record associated with said originating telephone call to the data network and having a receiver to receive said assigned transfer routing telephone number transmitted thereto via the data network; and
a second assignment server associated with said second call connector, said second assignment server having a data receiver to receive said data record associated with said originating telephone call and transmitted by said first assignment server, said second assignment server having a selector processing unit to select said assigned transfer routing telephone number from a pool of transfer routing telephone numbers, said second assignment server having a data transmitter to transmit said assigned transfer routing telephone number to said receiver of first assignment server via the data network, said second assignment server having an electronic index generator to generate an electronic index for said assignment which indexes said assigned transfer routing telephone number to said data record associated with said originating telephone call; and
wherein said access processor uses said index to access said data record associated with said originating telephone call with said assigned transfer routing telephone number.

9. The system of claim 1 wherein said access processor uses said data record associated with said originating telephone call to access another data record.

10. The system of claim 1 wherein said data record associated with said originating telephone call contains information about said originating telephone call.

11. The system of claim 1 wherein said first call connector is non-homogeneous with said second call connector.

12. The system of claim 1, further including:
first and second application servers associated with first and second call centers, respectively, said first application server includes said call processor and said second application server includes said assignment processor and said access processor; and
first and second computer workstations associated with first and second application servers respectively, said first computer workstation configured to modify said data record associated with said originating telephone call and said second computer workstation configured to retrieve information via said access processor based on said data record associated with said originating telephone call.

13. A data record and telephone call handling system for use with a telephone network and a data network, said data record and telephone call handling system comprising:
a first telephone call receiver configured to receive telephone calls including telephone calls originated by call origination devices;
data records, each associated with one of said originating telephone calls originated by one of said call origination devices;
an assignment processor configured to assign a transfer routing telephone number to each of said data records to produce an assignment;
a call processor associated with said first telephone call receiver and configured to use said assigned transfer routing telephone number to initiate a call processor controlled telephone call via the telephone network to a second telephone call receiver, said call processor configured to include said originating call origination device in said processor telephone call to place said originating call origination device in communication with said second telephone call receiver; and
an access processor associated with said second telephone call receiver, said access processor configured to use said assigned transfer routing telephone number and said assignment to access said data record associated with said originating telephone call.

14. A data record and telephone call handling system for use with a telephone network and a data network, said data record and telephone call handling system comprising:
a first call connector configured to receive and route telephone calls originating with call origination devices;
a first telephone call receiver associated with said first call connector, said first telephone call receiver configured to receive telephone calls from said first call connector originated by said call origination devices;
data records, each associated with one of said originating telephone calls originated by one of said call origination devices;
a selector configured to select DID numbers from a set of DID numbers;
an index generator configured to generate an electronic index to link one of said selected DID numbers to each of said data records to produce an index;
a second call connector configured to receive and route telephone calls placed to telephone numbers including said set of DID numbers from said first call connector;
a call processor associated with said first call connector, said call processor configured to use said selected DID number to initiate a call processor controlled telephone call via the telephone network to said second call connector while said originating call origination device remains connected via said originating telephone call to said first call connector, said call processor configured to include said originating call origination device in said processor telephone call;
a second telephone call receiver associated with said second call connector, said second telephone call receiver configured to receive telephone calls from said second call connector including said call processor controlled telephone call; and
an access processor associated with said second call connector, said access processor configured to use said selected DID number and said index to access said data record associated with said originating telephone call.

15. The system of claim 14 wherein said set of DID numbers is those DID numbers that arc available from a pool of reusable DID numbers, the available DID numbers including a most recently made available DID number and a least recently made available DID number, wherein an available DID number becomes unavailable upon being selected by said selector and linked to said data record associated with said originating telephone call and remains unavailable until said access processor accesses said data record associated with said originating telephone call.

16. The system of claim 15 wherein prior to selection, said selected DID number was the most recently made available DID number.

17. The system of claim 15 wherein prior to selection, said selected DID number was the least recently made available DID number.

18. The system of claim 14 wherein said selector selects from said set of DID numbers based on an ordering within said set of DID numbers.

19. The system of claim 18 wherein said ordering within said set of DID numbers comprises a sequential order.

20. A data record and telephone call handling system for use with a telephone network and a data network, said data record and telephone call handling system comprising:
- a plurality of call connectors including first, second, and third call connectors, said first call connector configured to receive and route telephone calls from the plurality of call connectors;
- a telephone call receiver associated with said first call connector, said telephone call receiver configured to receive a telephone call from said first call connector, including a connector telephone call from said second call connector, wherein said second call connector uses a connector telephone number to identify to the telephone network said first call connector as the recipient of said connector telephone call;
- a data record associated with an original telephone call to said third call connector;
- a processor associated with said first call connector, said processor configured to use said connector telephone number to access said data record associated with said original telephone call.

21. A data record and telephone call handling system for use with a telephone network and a data network, said data record and telephone call handling system comprising:
- a data record generator configured to generate an electronic data record unique to each telephone call of a plurality of telephone calls; and
- an index generator configured to generate an electronic index to link to each said electronic data record a transfer routing telephone number that identifies to the telephone network a call connector to which the corresponding telephone call is transferred and serves to access the electronic data record at that call connector.

22. The system of claim 21 wherein said transfer routing telephone number linked to each said electronic data record is from a pool of available DID numbers.

23. A data record and telephone call handling method for use with a telephone network and a data network, said data record and telephone call handling method comprising:
- receiving a first telephone call associated with a data record;
- selecting a transfer routing telephone number;
- assigning said telephone number to said data record to produce an assignment;
- establishing a transfer telephone call using said transfer routing telephone number; and
- accessing said data record using said transfer routing telephone number and said assignment.

24. The method of claim 23 wherein said transfer routing telephone number is selected from transfer routing telephone numbers in a pool of reusable available transfer routing telephone numbers, wherein an available transfer routing telephone number becomes an unavailable transfer routing telephone number upon being selected and remains unavailable until said data record to which said unavailable transfer routing telephone number is assigned, is accessed.

25. The method of claim 23 wherein said transfer routing telephone number is selected from an ordered set of transfer routing telephone numbers based upon an ordering of said set of transfer routing telephone numbers.

26. The method of claim 23 wherein said accessing is through the data network separate from the telephone network used for the transfer telephone call.

27. The method of claim 23 wherein said transfer routing telephone number is selected from a pool of available DID numbers.

28. A data record and telephone call handling system for use with a telephone network and a data network, said data record and telephone call handling system comprising:
- call connectors configured to receive and route telephone calls, including telephone calls originating with call origination devices, each call connector being associated with a pool of transfer routing telephone numbers;
- telephone call receivers, each associated with one of said call connectors and configured to receive telephone calls from said associated call connector;
- data records, each associated with one of said originating telephone calls originated by one of said call origination devices;
- assignment processors, each configured to assign one of said transfer routing telephone numbers associated with said call connectors to each of said originating telephone calls to produce an assignment;
- call processors, each associated with one of said call connectors, said call processors configured to use one of said assigned transfer routing telephone numbers to initiate transfer of said originating telephone call corresponding thereto via the telephone network to said call connector associated with said assigned transfer routing telephone number for receipt by said telephone call receiver associated therewith, while said call origination device originating said originating telephone call remains connected via said originating telephone call to said call connector originally receiving said originating telephone call; and
- access processors, each associated with one of said call connectors, said access processors each configured to use said assigned transfer routing telephone number of said call connector associated with said assigned transfer routing telephone number and said assignment to access said data record associated with said originating telephone call.

* * * * *